(12) United States Patent
Ducard

(10) Patent No.: US 11,839,817 B1
(45) Date of Patent: Dec. 12, 2023

(54) GAMING SYSTEM AND METHOD INCLUDING THE IDENTIFICATION OF NON-PLAYER CHARACTERS

(71) Applicant: Hudson Ducard, Los Angeles, CA (US)

(72) Inventor: Hudson Ducard, Los Angeles, CA (US)

( * ) Notice: Subject to any disclaimer, the term of this patent is extended or adjusted under 35 U.S.C. 154(b) by 64 days.

(21) Appl. No.: 17/836,732

(22) Filed: Jun. 9, 2022

(51) Int. Cl.
*A63F 13/56* (2014.01)

(52) U.S. Cl.
CPC ................... *A63F 13/56* (2014.09)

(58) Field of Classification Search
CPC .......... A63F 13/55; A63F 13/56; A63F 13/57; A63F 13/58; A63F 13/60; A63F 13/65; A63F 13/79; A63F 13/798; A63F 2300/55; A63F 2300/5526; A63F 2300/5533
See application file for complete search history.

(56) References Cited

U.S. PATENT DOCUMENTS

| | | | | |
|---|---|---|---|---|
| 2006/0003305 A1* | 1/2006 | Kelmar | ................... | G09B 23/28 434/350 |
| 2006/0148545 A1* | 7/2006 | Rhyne, IV | ............ | A63F 13/822 463/1 |
| 2007/0129126 A1* | 6/2007 | Van Luchene | .......... | A63F 13/85 463/1 |
| 2007/0129148 A1* | 6/2007 | Van Luchene | ......... | G06Q 50/10 463/1 |
| 2008/0004093 A1* | 1/2008 | Van Luchene | .......... | G07F 17/32 463/1 |
| 2009/0253475 A1* | 10/2009 | Thompson | ............... | A63F 13/35 463/7 |
| 2011/0230258 A1* | 9/2011 | Van Luchene | .......... | A63F 13/77 463/43 |
| 2011/0230267 A1* | 9/2011 | Van Luchene | .......... | A63F 13/77 463/43 |
| 2013/0045807 A1* | 2/2013 | Macrae | .................... | A63F 13/12 463/43 |
| 2014/0342808 A1* | 11/2014 | Chowdhary | .......... | A63F 13/493 463/24 |
| 2016/0166935 A1* | 6/2016 | Condrey | .................. | A63F 13/48 463/31 |
| 2016/0279522 A1* | 9/2016 | de Plater | .................. | A63F 13/58 |
| 2017/0120150 A1* | 5/2017 | Berger | ..................... | A63F 13/45 |
| 2020/0197811 A1* | 6/2020 | Eatedali | ................. | A63F 13/335 |
| 2022/0193554 A1* | 6/2022 | Kim | ........................ | A63F 13/67 |

* cited by examiner

*Primary Examiner* — David L Lewis
*Assistant Examiner* — Matthew D Hoel
(74) *Attorney, Agent, or Firm* — Cohen IP Law Group, PC; Michael N. Cohen

(57) ABSTRACT

A gaming platform is provided in which players control player characters to interact with other player characters controlled by other users as well as with non-player characters (NPCs) controlled by NPC engines. Players are tasked to identify which of the other characters within the game are controlled by other players (i.e., controlled in real time by humans) and which of the characters are NPCs controlled by NPC engines. Interactions between the players and between the players and the NPCs may include verbal communications, typed communications, physical communications, other types of communications, and any combinations thereof. The gaming platform is able to receive non-standardized NPCs and NPC engines from third-party developers and subsequently standardize them for inclusion in the gaming platform.

13 Claims, 5 Drawing Sheets

GAMING SYSTEM AND METHOD INCLUDING THE IDENTIFICATION OF NON-PLAYER CHARACTERS

FIELD OF THE INVENTION

This invention relates to gaming, including a gaming system and method for providing, converting, and interacting with non-player characters (NPCs).

BACKGROUND

Non-player characters (NPCs) controlled by various forms of artificial intelligence (AI) have become ubiquitous throughout the world. Such virtual characters are used within gaming environments, as online customer service agents, and in other applications.

Recent development of such NPCs has resulted in NPCs having the ability to replicate human interactions to such an extent that it may be difficult at times to discern whether a person is interacting with a real person character or with an NPC.

However, there are currently no gaming environments that facilitate the interaction between human user characters and NPCs with the purpose of discerning which characters are human player characters and which characters are NPCs.

Accordingly, there is a need for a gaming system and method that challenges human players to discern between other human characters and NPCs through mutual interactions.

BRIEF DESCRIPTION OF THE DRAWINGS

Other objects, features, and characteristics of the present invention as well as the methods of operation and functions of the related elements of structure, and the combination of parts and economies of manufacture, will become more apparent upon consideration of the following description and the appended claims with reference to the accompanying drawings, all of which form a part of this specification. None of the drawings are to scale unless specifically stated otherwise.

DETAILED DESCRIPTION OF EXEMPLARY EMBODIMENTS

Figure 1:
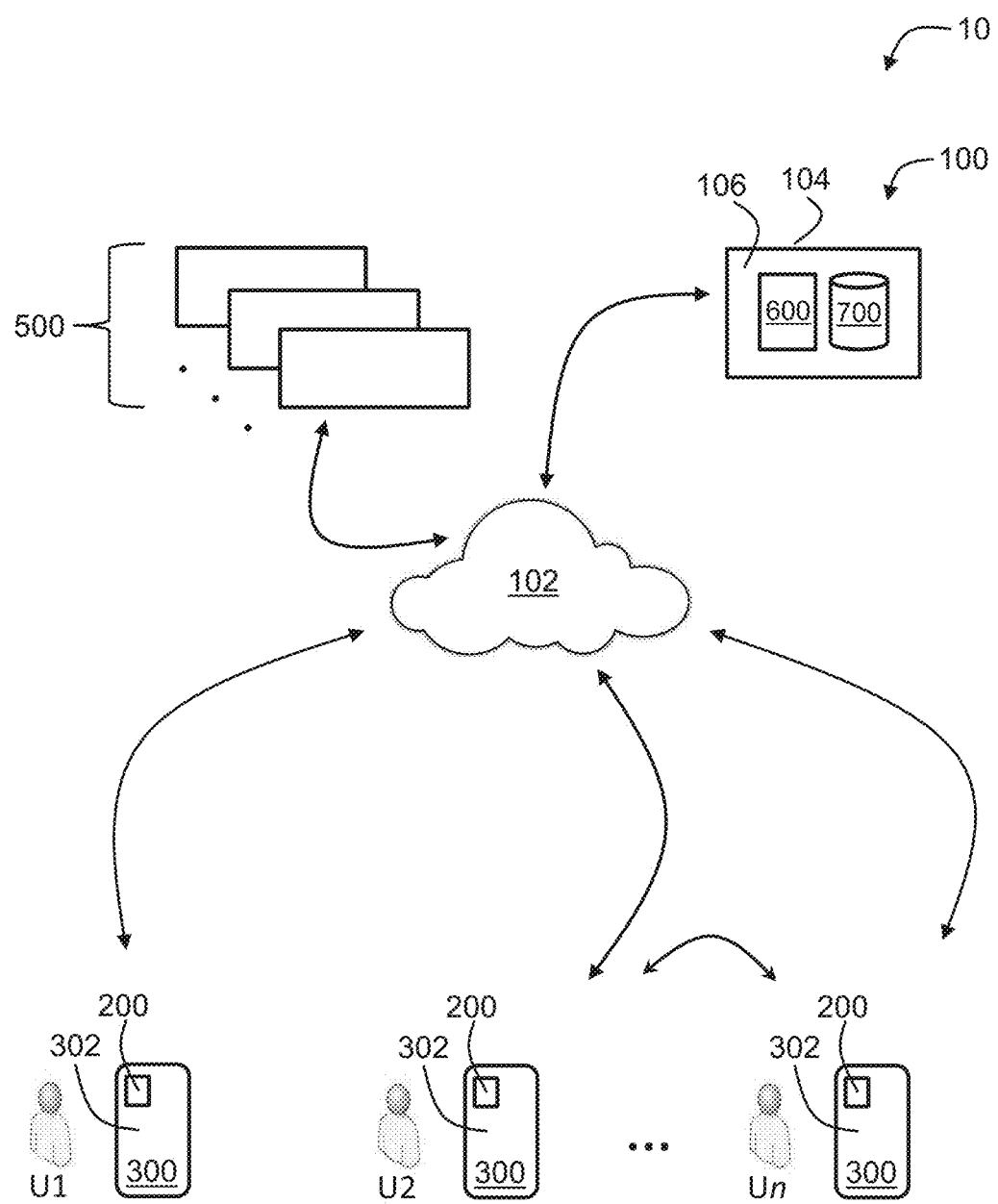
FIG. 1 shows an overview of a gaming system in accordance with exemplary embodiments hereof.

In general, the system according to exemplary embodiments hereof provides a gaming system and method. In some embodiments, the system provides a gaming environment in which players may interact with entities within the game including other players as well as non-player characters (NPCs). In some embodiments, players of the game are tasked to identify which of the entities within the game are other players (i.e., controlled in real time by humans) and which of the entities are NPCs. Interactions between the players and between the players and the NPCs may include verbal communications, typed communications, physical communications, other types of communications, and any combinations thereof.

As used herein, unless used otherwise, the following terms and abbreviations have the following meanings:

Player Character is generally defined as a character within a gaming environment that is generally controlled by a human player of the game. The player character may be represented as a two-dimensional (2D) and/or three-dimensional (3D) avatar and/or as any other type of character.

Non-Player Character (NPC) is generally defined as a character within a gaming environment that is not generally controlled by a human player of the game (e.g., a virtual character). Instead, an NPC is controlled by an NPC engine. The NPC may be represented as a two-dimensional (2D) and/or three-dimensional (3D) avatar and/or as any other type of character.

NPC Engine is generally defined as any system (e.g., artificial intelligence (AI)) that controls the actions of an NPC within a gaming environment. The actions may include, without limitation, speech, dialogue, commentary, gestures, facial expressions, body language, movements, other types of actions, and any combinations thereof. An NPC engine may include any type of NPC controller, including, but not limited to, an embodied agent, a conversational agent, an intelligent agent (IA), a dialogue system including an input recognizer/decoder, an automatic speech recognizer (ASR), a gesture recognizer, a handwriting recognizer, a natural language understanding unit (NLU), a dialogue manager, an output generator, a natural language generator, a gesture generator, a layout manager, an output renderer, a text-to-speech engine (TTS), a speech-to-text engine (STT), a talking head, a robot or avatar, any other types of AI including, but not limited to, Generative Pre-Trained Transformer 2 (GPT-2), Generative Pre-Trained Transformer 3 (GPT-3), any other language model(s) (autoregressive and/or otherwise), any other types of NPC engines, and any combinations thereof. As will be described in other sections, NPC engines may be provided by the gaming system and/or by external entities/developers (in which case the third-party NPC engines are subsequently integrated into the gaming system).

Gaming Environment is generally defined as the environment, background, and/or layout (e.g., the computer controlled digital setting or virtual world) in which player characters interact with other player characters and with NPCs. Gaming environments may be 2D and/or 3D, and may be supported using any type of gaming device, including, but not limited to, smart phones, tablet computers, laptops, desktop computers, gaming consoles, virtual reality (VR) headsets and systems, augmented reality (AR) systems, mobile media players, etc.

FIG. 1 shows an overview of an exemplary framework for a gaming system 10 (also referred to herein as simply the system 10) according to exemplary embodiments hereof. As shown, the gaming system 10 may include a backend system 100 that may interface with users U of the system 10 (individually and/or collectively) via one or more application interfaces 200 (e.g., a mobile application or "app", a computer application, a game console application, a browser, website or Internet interface, or other type(s) of applications) running on one or more computing devices 300 (e.g., smart phones, tablet computers, laptops, desktop computers, gaming consoles, mobile media players, etc.). It is understood that the system 10 may interface with any number of users U at any time. The system 10 also may include other systems, elements and components as required by the system 10 to fulfill its functionalities.

The system 10 may interface with various external entities and/or systems 500 such as providers of NPC engines and other game developers. For example, the system 10 may receive NPC engines from third-party entities for integration into the system 10. For example, and as described in other sections, the system 10 provides an interface and necessary protocols (e.g., APIs, SDKs, etc.) for third-party developers of NPC engines to upload, link, and/or integrate their NPC engines into the system 10. The system 10 also includes the necessary functionalities itself to standardize non-standard NPC engines for use with the system 10.

The backend system 100 includes one or more servers 104 including one or more software systems 106, one or more applications 600, and one or more databases 700. The one or more software systems 106 may include operating systems, system software, web server software, social networking software, communication software, software applications, scripts, firmware, other types of software systems, and any combinations thereof. The applications 600 and databases 700 will be described in other sections.

The computing devices 300 and the backend controller 100 may preferably be connected to one or more networks 102 (e.g., the Internet, LAN, WAN, wireless communication systems, cellular communication systems, telephony or other types of communication systems or protocols) and may communicate thereby. In some embodiments, the backend controller 100 may include a cloud platform (e.g., one or more backend servers), one or more local controllers, or any combination thereof. In some embodiments, the backend controller 100 includes a cloud platform that interfaces with one or more local controllers. For example, administrators of the system 10 may interface with the system 10 via a local controller in communication to a cloud platform.

In some embodiments, the application 200 ("app") provides a graphical user interface (GUI) that enables a user U to interface with the application 200, the backend 100, and the overall system 10. The application 200 may generally provide an interface 302 with which the user U may receive visual, audible, haptic, and other types of multimedia content (e.g., a gaming environment). The interface 302 also may enable the user U to enter information for the system 10 to utilize (e.g., upload to the backend 100), and provide interface controls (e.g., touchscreen buttons, game controllers, etc.) for a user U to activate while interacting with the system 10. The application 200 also may display data and other types of information that a user U may read or otherwise consume and/or provide to other users U. In general, and in some embodiments, the application 200 may provide a primary interface 302 with which a user U may interact with the system 10.

Figure 2:
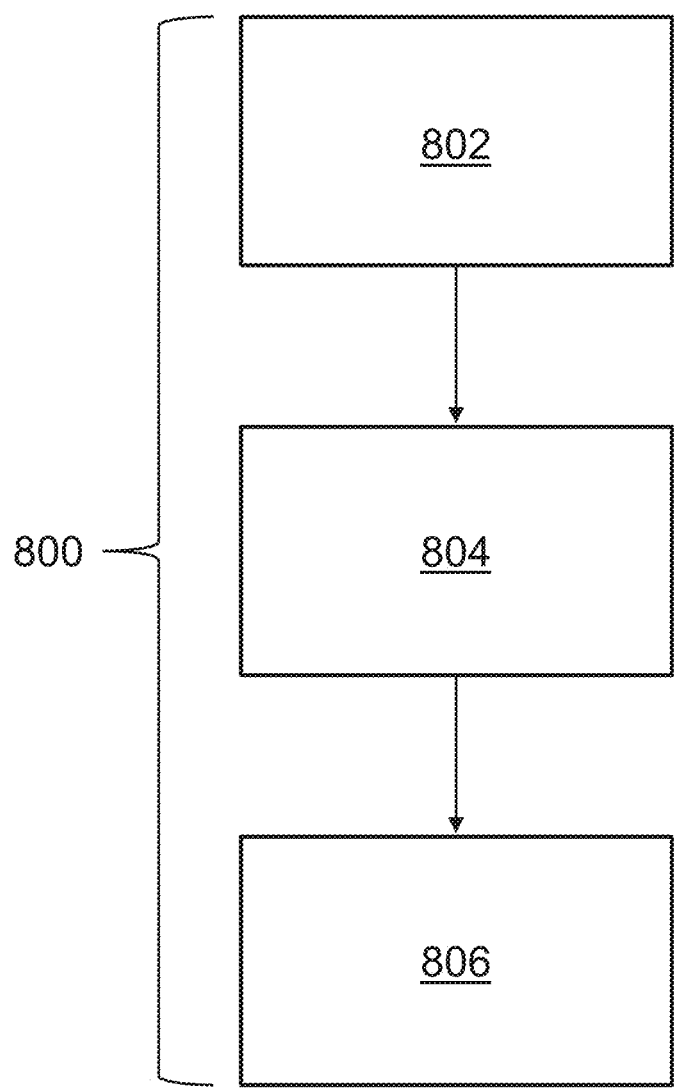
FIG. 2 shows example workflow actions taken by a gaming system in accordance with exemplary embodiments hereof.

In some embodiments, as shown in FIG. 2, the gaming system 10 generally performs at least some of the following actions 800:

802: Places a plurality of player characters (each controlled by a distinct user U) in a gaming environment with one another and with one or more non-player characters (NPCs);

804: Enables all of the characters (both player characters and NPCs) to interact with one another; and

806: Challenges the users U to determine which of the characters are NPCs and which of the characters are player characters.

Users U that are able to correctly discern the subtle differences between player characters and non-player characters may be rewarded (e.g., receive points and/or increased status) while users U who choose incorrectly may be penalized (e.g., lose points, lose status, be eliminated, etc.).

In some embodiments, the player characters and non-player characters all interact within the gaming environment via verbal conversations with one another individually and/or within a group, textual conversations, body language, facial expressions, physical actions, and/or through other types of gameplay actions.

In some embodiments, the system 10 provides gaming modes and environments that facilitate interactions between the various characters. For example, the system 10 may present game modes such as, without limitation, free for all (FFA), detective, clockwise, other types of game modes, and any combinations thereof. In another example, the gaming environment may include a social party at a fun and exciting virtual location (e.g., an entertainment venue, bar, festival, etc.) so that the characters are free to interact, get to know one another, and establish relationships. In another example, the gaming environment may include an adventure arc wherein the users U are assigned various tasks to accomplish within an exciting storyline. In this way, the characters may be forced to work together as a team. In yet another example, the gaming environment may include a meeting regarding a specific topic of conversation (e.g., philosophical, hobby-related, technical, various topics of mutual interest, etc.). It is understood that the examples provided above are meant for demonstration and that the gaming environment may include any gaming environments and/or elements as desired and that the scope of the system 10 does not depend in any way on the type(s) of gaming environments and/or elements that it may provide.

In some embodiments, the system 10 may be incorporated into one or more third party gaming environments to add additional elements of gameplay to those games and environments.

Figure 3:
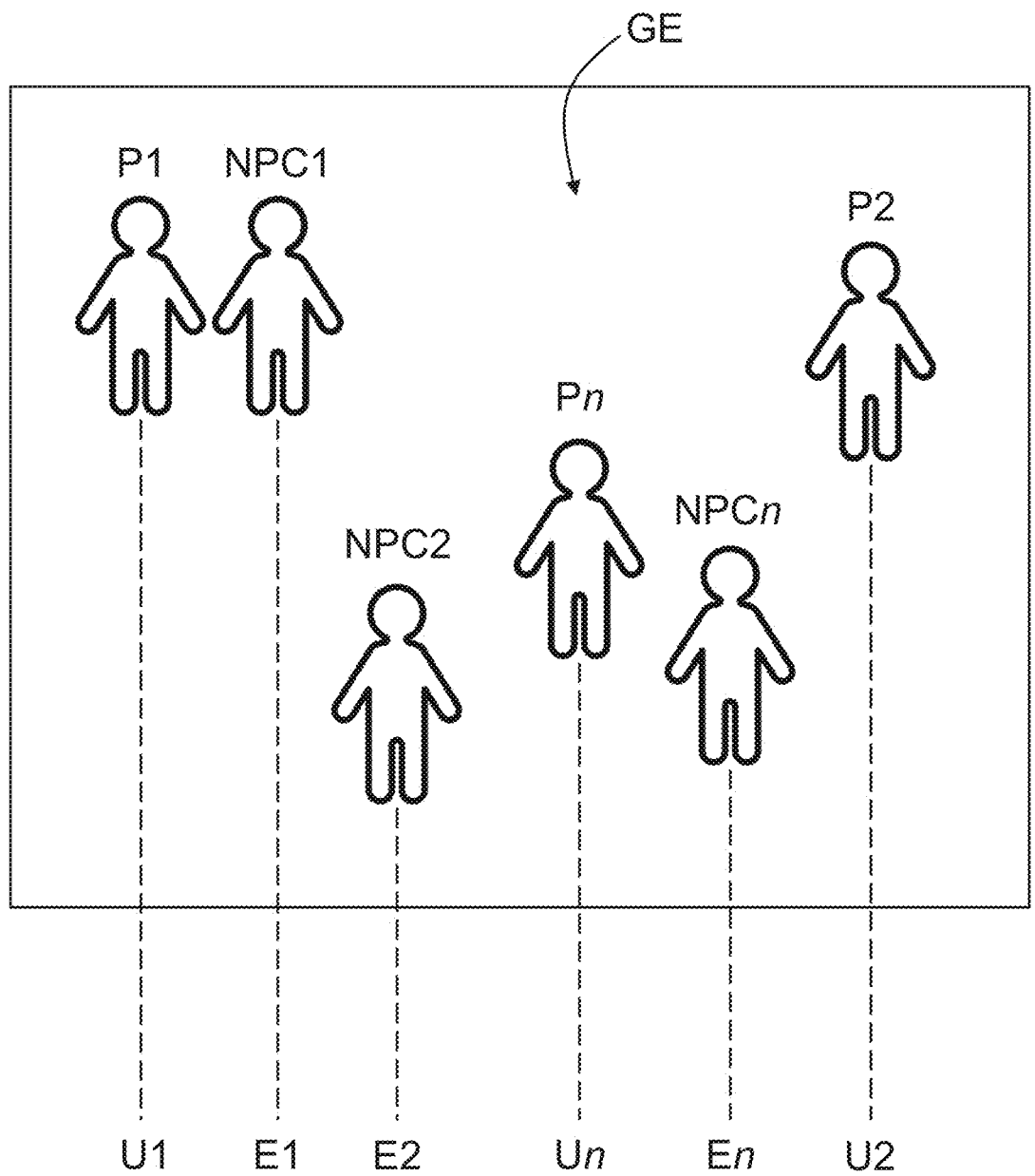
FIG. 3 shows a representation of a gaming environment provided by a gaming system in accordance with exemplary embodiments hereof.

In some embodiments, as shown in FIG. 3, the system 10 may provide a gaming environment GE within which a first NPC1 is controlled by a first NPC engine E1, a second NPC2 is controlled by a second NPC engine E2, . . . and nth NPCn is controlled by an nth NPC engine En. Notably, in this way, some NPCs may be more difficult to discern from player characters than others depending on the efficiencies of the NPC engines En. Player characters in FIG. 3 are identified as P1, P2, . . . Pn and are controlled by users U1, U2, . . . Un, respectively.

In some embodiments, a first NPC engine E1 may be provided by the system 10, a second NPC engine E2 may be provided by a first third-party entity, a third NPC engine E3 may be provided by a second third-party entity, and an nth NPC engine En may be provided by an nth third-party entity. In this way, the efficiency with which the NPC engines En are able to simulate true and natural human interaction may be compared directly with one another during interaction with player characters within the gaming environment(s).

In some embodiments, third-party NPC engines are uploaded and/or linked to the system 10 for integration into one or more gaming environments provided by the system 10. For example, the system 10 may include a data intake application 604 adapted to receive third-party NPC engines and to store the NPC engines into an NPC engine database 704.

In some embodiments, the system 10 includes an NPC engine integration application 606 that modifies each third-party NPC engine, as necessary, for use with the system 10. For example, the NPC engine integration application 606 may convert an NPC engine provided by a third-party entity in a first format into a second format, e.g., from a non-standardized format into a standardized format used by the system 10, so that the third-party NPC engine may run properly within the system 10. The standardized updated NPC engines may then be stored into the NPC engine database 704 for use. In this way, the system 10 may receive third-party NPC engines from a variety of third-party developers provided in a variety of different formats, convert the engines to a standardized format, and thereby enable the engines to run within a gaming environment provided by the system 10.

In some embodiments, it is preferable that the player characters and the NPCs communicate using the same methods so that the methods of communication may not provide an indication as to whether a character is a player character or an NPC. For example, in some embodiments, the characters may all communicate via text using speech balloons (also referred to as speech bubbles, dialogue balloons, or word balloons). In this example, a user U may type his/her textual message using a keyboard and the message may appear within the gameplay as a speech balloon. Alternatively, a user U may speak into a microphone and the system 10 may translate the speech into text using a speech-to-text application and display the translated text as a speech balloon within the gameplay. In these cases, each NPC also may communicate via textual speech balloons.

In another example, a user U may speak into a microphone and the system 10 may convert the speech into a synthetic voice within the game play that matches the synthetic voice of each NPC. In another example, the user U may type a textual message and the system 10 may convert the typed message into a synthetic voice. It is understood that the users U and the NPCs may communicate with one another using any type of communication means, as well as any combinations of types of communication means (e.g., synthetic voice in addition to speech balloons), and that regardless of the communication means utilized, it may be preferable that the player characters and the NPCs utilize the same or similar communication means.

In some embodiments, the system's NPC engine integration application 606 may convert the communication means that a particular third-party NPC may utilize to match the communication means used by the player characters within a particular system gaming environment. For example, if a third-party NPC is programmed to utilize a synthetic voice and the character players utilize speech balloons, the NPC engine integration application 606 may convert the third-party NPC from a format that uses the synthetic voice to a format that uses speech balloons (e.g., via a speech-to-text application). In another example, if a third-party NPC is programmed to utilize a speech balloons and the character players utilize synthetic voices, the NPC engine integration application 606 may convert the third-party NPC from a format that uses speech balloons to a format that uses a synthetic voice (e.g., via a text-to-speech application).

In some embodiments, once the NPC engines are converted to utilize the same communication methods as the player characters, the system's NPC engine execution application 608 may cause the engines to run within a gaming environment.

In some embodiments, it is preferable that the characters (both the user characters and the NPCs) displayed within a gaming environment by the system 10 all resemble one another in general appearance, movement ability, and other characteristics so that these characteristics may not provide any indication as to whether a character is a user character or an NPC. That is, by having all of the characters generally resemble one another in the way they look and move, the look and movement of the characters may not tip off the users U regarding which character is an NPC and which character is a user character.

In some embodiments, the system's NPC engine integration application 606 may convert any non-standardized physical attributes or characteristics (e.g., appearance, movement abilities, etc.) of any particular NPC engine provided by a third-party into a standardized physical attribute or characteristic that resembles the other characters provided within a gaming environment. The standardized updated NPC engines may then be stored into the NPC engine database 704 for use. In this way, identifying NPC characters during gameplay is based predominantly on the efficiency of the NPC engines' ability to replicate human interaction.

In some embodiments, some specific physical character attributes may be customizable by the users U. Specifically, attributes that may not typically indicate whether a character is an NPC or a user character may be customized. For example, clothing and other attributes may be customized without negatively affecting the concept of the gameplay.

In some embodiments, once the NPC engines are standardized, the system's NPC engine execution application 608 may cause the engines to run within a gaming environment.

In some embodiments, the system 10 implements triggers that cause the NPCs to interact with the user characters, and vise versa. For example, if a player character speaks to or otherwise interacts with an NPC (e.g., taps him/her on the shoulder), the NPC is triggered to respond to the player character accordingly. In addition, if an NPC has not been addressed by a player character within a prespecified amount of time, the system 10 may trigger the NPC to approach a player character and begin a conversation.

In some embodiments, a user U may choose to identify a particular character within the gameplay as an NPC. This may be accomplished by utilizing a mouse (e.g., right-mousing clicking on the character and choosing "Identify as an NPC"), tapping the character on a touchscreen, pointing to a character using a prespecified hand gesture within a VR environment, by other identification methods, and by any combinations thereof.

In some embodiments, once a user U has identified a character as an NPC, if he/she is correct, the NPC may be identified to the other users U, removed from the gaming environment, etc. In addition, the user U who correctly identified the NPC may be rewarded with points, game status, and/or with other types of rewards. However, if the user U incorrectly identifies the character as an NPC but the character is in fact another user character, the user U may be penalized by losing points, losing status, may be eliminated from the gameplay entirely, and/or by other types of penalties.

In some embodiments, when a user U is eliminated from the gameplay, he/she may continue to view the gameplay of other users U (e.g., from a spectator booth, an overhead blimp, etc.). In some embodiments, eliminated users U may be offered an opportunity to return to gameplay after meeting specified criteria (e.g., after a waiting period, if other users U with less points are eliminated, etc.).

System Structure

Figure 4:
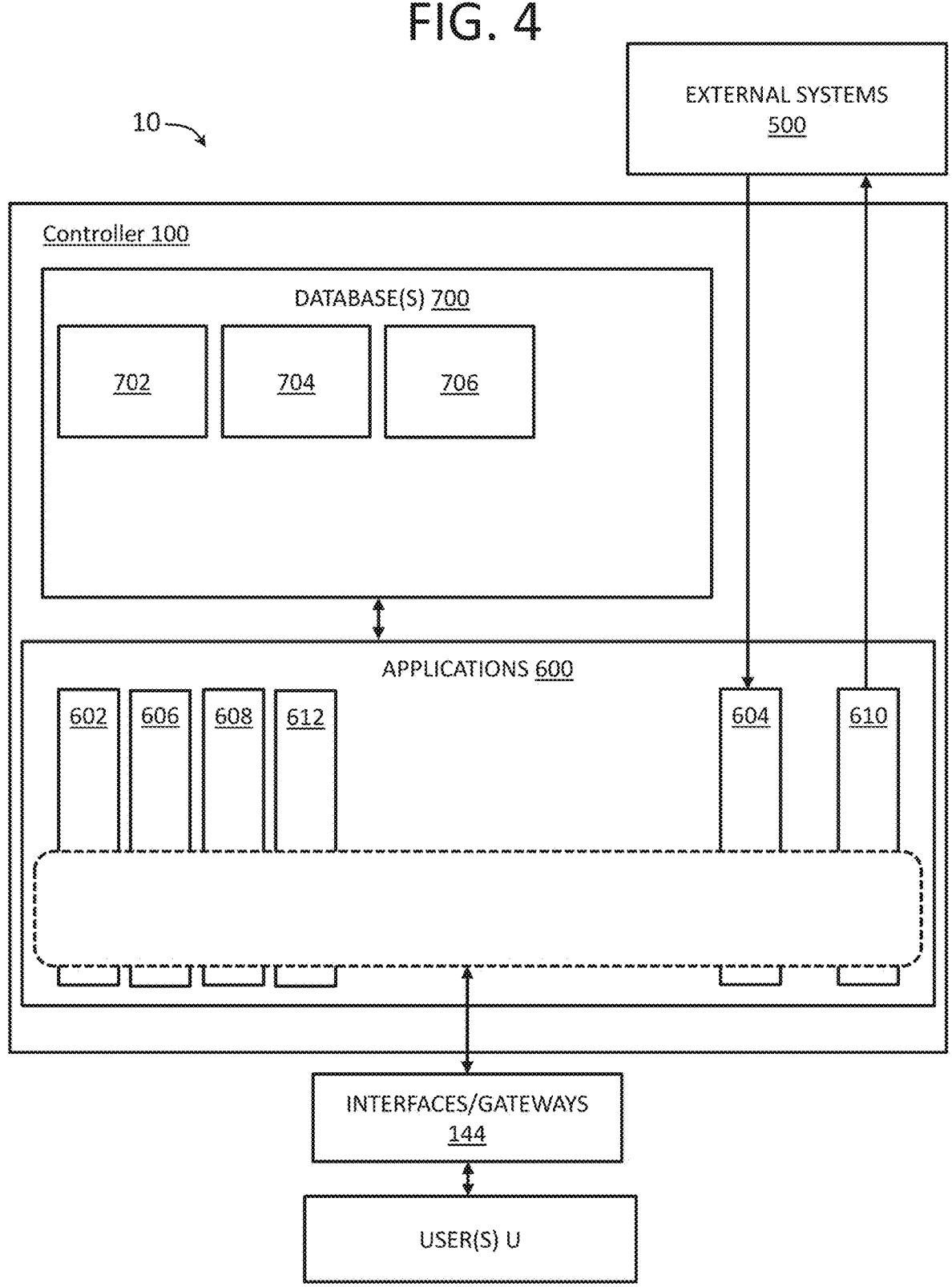
FIG. 4 shows aspects of a gaming system computing environment in accordance with exemplary embodiments hereof.

FIG. 4 shows aspects of an exemplary gaming system 10 of FIG. 1. As shown, the system 10 and backend system 100 comprises various internal applications 600 and one or more databases 700, described in greater detail below. The internal applications 600 may generally interact with the one or more databases 700 and the data stored therein.

The database(s) 700 may comprise one or more separate or integrated databases, at least some of which may be distributed. The database(s) 700 may be implemented in any manner, and, when made up of more than one database, the various databases need not all be implemented in the same way. It should be appreciated that the system is not limited by the nature or location of database(s) 700 or by the manner in which they are implemented.

Each of the internal applications 600 may provide one or more services via an appropriate interface. Although shown as separate applications 600 for the sake of this description, it is appreciated that some or all of the various applications 600 may be combined. The various applications 600 may be implemented in any manner and need not all be implemented in the same way (e.g., using the same software languages, interfaces, or protocols).

In some embodiments, the applications 600 may include one or more of the following applications 600:
1. Registration and authentication application(s) 602. This application may receive identity information from the user U, authenticate the identity of the user U, create a user's system profile, and perform other actions, as necessary.
2. Data input application(s) 604. This application may receive any type of input data from any applicable system and/or element such as the application 200, the electronic device 300, the external system(s) 500 (e.g., third-party NPC engines from third-party developers), any other system and/or element and any combination thereof.
3. NPC engine integration application(s) 606: This application may convert any NPC engine provided by a third-party entity in a first format into a second format, e.g., from a non-standardized format into a standardized format used by the system 10, so that the third-party NPC engine may run properly within the system 10.
4. NPC engine execution application(s) 608: This application may cause any NPC engine (whether provided by the system 10 and/or by a third-party entity) to run within the system 10.
5. Data output applications(s) 610. This application may output any type of output data to any applicable system and/or element such as the application 200, the mobile device 300, the external system(s) 500, any other system and/or element and any combination thereof.
6. Data reporting application(s) 612. This application may generate any type of report and/or other types of information regarding the use and/or functionalities of the system 10.

The applications 600 also may include other applications and/or auxiliary applications (not shown). Those of ordinary skill in the art will appreciate and understand, upon reading this description, that the above list of applications is meant for demonstration and that the system 10 may include other applications that may be necessary for the system 10 to generally perform its functionalities as described in this specification. In addition, as should be appreciated, embodiments or implementations of the system 10 need not include all of the applications listed, and that some or all of the applications may be optional. It also is understood that the scope of the system 10 is not limited in any way by the applications that it may include.

In some embodiments, the database(s) 700 may include one or more of the following databases:
1. Consumer profile database(s) 702. This database may store any data and/or other types of information related to a user U.
2. NPC Engine database(s) 704. This database may store any and/or all information relating to and including any NPC engine (provided by the system 10 and/or from third-party developers).
3. Data report(s) database(s) 706. This database may store any reports of any kind generated by the system 10.

It is understood that the above list of databases is meant for demonstration and that the system 10 may include some or all of the databases, and also may include additional databases as required. It also is understood that the scope of the system 10 is not limited in any way by the databases that it may include.

Various applications 600 and databases 700 in the gaming system 10 may be accessible via interface(s) 142. These interfaces 142 may be provided in the form of APIs or the like and made accessible to users U via one or more gateways and interfaces 144 (e.g., via a web-based application 200 and/or a mobile application 200 running on a user's device 300).

Computing

The services, mechanisms, operations, and acts shown and described above are implemented, at least in part, by software running on one or more computers or computer systems or devices. It should be appreciated that each user device is, or comprises, a computer system.

Programs that implement such methods (as well as other types of data) may be stored and transmitted using a variety of media (e.g., computer readable media) in a number of manners. Hard-wired circuitry or custom hardware may be used in place of, or in combination with, some or all of the software instructions that can implement the processes of various embodiments. Thus, various combinations of hardware and software may be used instead of software only.

One of ordinary skill in the art will readily appreciate and understand, upon reading this description, that the various processes described herein may be implemented by, e.g., appropriately programmed general purpose computers, special purpose computers and computing devices. One or more such computers or computing devices may be referred to as a computer system.

Figure 5:
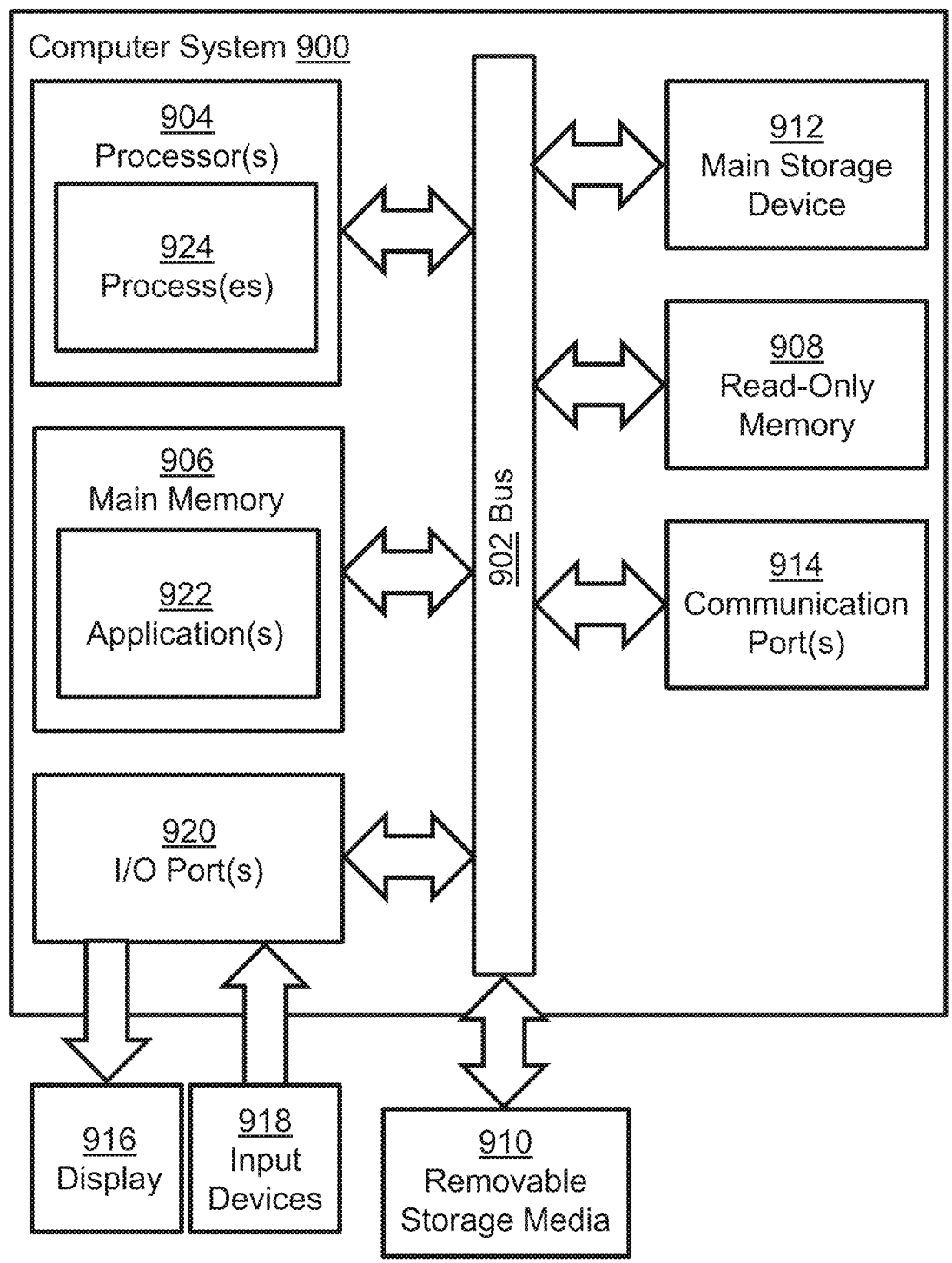
FIG. 5 depicts aspects of computing and computer devices in accordance with exemplary embodiments hereof.

FIG. 5 is a schematic diagram of a computer system 900 upon which embodiments of the present disclosure may be implemented and carried out.

According to the present example, the computer system 900 includes a bus 902 (i.e., interconnect), one or more processors 904, one or more communications ports 914, a main memory 910, removable storage media 910, read-only memory 908, and a mass storage 912. Communication port(s) 914 may be connected to one or more networks by way of which the computer system 900 may receive and/or transmit data.

As used herein, a "processor" means one or more microprocessors, central processing units (CPUs), computing devices, microcontrollers, digital signal processors, or like devices or any combination thereof, regardless of their architecture. An apparatus that performs a process can include, e.g., a processor and those devices such as input devices and output devices that are appropriate to perform the process.

Processor(s) 904 can be (or include) any known processor, such as, but not limited to, an Intel® Itanium® or Itanium 2® processor(s), AMD® Opteron® or Athlon MP® processor(s), or Motorola® lines of processors, and the like. Communications port(s) 914 can be any of an RS-232 port for use with a modem-based dial-up connection, a 10/100 Ethernet port, a Gigabit port using copper or fiber, or a USB port, and the like. Communications port(s) 914 may be chosen depending on a network such as a Local Area Network (LAN), a Wide Area Network (WAN), a CDN, or any network to which the computer system 900 connects. The computer system 900 may be in communication with peripheral devices (e.g., display screen 910, input device(s) 918) via Input/Output (I/O) port 920. Some or all of the peripheral devices may be integrated into the computer system 900, and the input device(s) 918 may be integrated into the display screen 910 (e.g., in the case of a touch screen).

Main memory 910 can be Random Access Memory (RAM), or any other dynamic storage device(s) commonly known in the art. Read-only memory 908 can be any static storage device(s) such as Programmable Read-Only Memory (PROM) chips for storing static information such as instructions for processor(s) 904. Mass storage 912 can be used to store information and instructions. For example, hard disks such as the Adaptec® family of Small Computer Serial Interface (SCSI) drives, an optical disc, an array of disks such as Redundant Array of Independent Disks (RAID), such as the Adaptec® family of RAID drives, or any other mass storage devices may be used.

Bus 902 communicatively couples processor(s) 904 with the other memory, storage and communications blocks. Bus 902 can be a PCI PCI-X, SCSI, a Universal Serial Bus (USB) based system bus (or other) depending on the storage devices used, and the like. Removable storage media 910 can be any kind of external hard-drives, floppy drives, IOMEGA® Zip Drives, Compact Disc—Read Only Memory (CD-ROM), Compact Disc—Re-Writable (CD-RW), Digital Versatile Disk—Read Only Memory (DVD-ROM), etc.

Embodiments herein may be provided as one or more computer program products, which may include a machine-readable medium having stored thereon instructions, which may be used to program a computer (or other electronic devices) to perform a process. As used herein, the term "machine-readable medium" refers to any medium, a plurality of the same, or a combination of different media, which participate in providing data (e.g., instructions, data structures) which may be read by a computer, a processor, or a like device. Such a medium may take many forms, including but not limited to, non-volatile media, volatile media, and transmission media. Non-volatile media include, for example, optical or magnetic disks and other persistent memory. Volatile media include dynamic random access memory, which typically constitutes the main memory of the computer. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications.

The machine-readable medium may include, but is not limited to, floppy diskettes, optical discs, CD-ROMs, magneto-optical disks, ROMs, RAMs, erasable programmable read-only memories (EPROMs), electrically erasable programmable read-only memories (EEPROMs), magnetic or optical cards, flash memory, or other type of media/machine-readable medium suitable for storing electronic instructions. Moreover, embodiments herein may also be downloaded as a computer program product, wherein the program may be transferred from a remote computer to a requesting computer by way of data signals embodied in a carrier wave or other propagation medium via a communication link (e.g., modem or network connection).

Various forms of computer readable media may be involved in carrying data (e.g. sequences of instructions) to a processor. For example, data may be (i) delivered from RAM to a processor; (ii) carried over a wireless transmission medium; (iii) formatted and/or transmitted according to numerous formats, standards or protocols; and/or (iv) encrypted in any of a variety of ways well known in the art.

A computer-readable medium can store (in any appropriate format) those program elements that are appropriate to perform the methods.

As shown, main memory 910 is encoded with application(s) 922 that support(s) the functionality as discussed herein (an application 922 may be an application that provides some or all of the functionality of one or more of the mechanisms described herein). Application(s) 922 (and/or other resources as described herein) can be embodied as software code such as data and/or logic instructions (e.g., code stored in the memory or on another computer readable medium such as a disk) that supports processing functionality according to different embodiments described herein.

During operation of one embodiment, processor(s) 904 accesses main memory 910 via the use of bus 902 in order to launch, run, execute, interpret or otherwise perform the logic instructions of the application(s) 922. Execution of application(s) 922 produces processing functionality of the service(s) or mechanism(s) related to the application(s). In other words, the process(es) 924 represents one or more portions of the application(s) 922 performing within or upon the processor(s) 904 in the computer system 900.

It should be noted that, in addition to the process(es) 924 that carries(carry) out operations as discussed herein, other embodiments herein include the application 922 itself (i.e., the un-executed or non-performing logic instructions and/or data). The application 922 may be stored on a computer readable medium (e.g., a repository) such as a disk or in an optical medium. According to other embodiments, the application 922 can also be stored in a memory type system such as in firmware, read only memory (ROM), or, as in this example, as executable code within the main memory 910 (e.g., within Random Access Memory or RAM). For example, application 922 may also be stored in removable storage media 910, read-only memory 908, and/or mass storage device 912.

Those skilled in the art will understand that the computer system 600 can include other processes and/or software and hardware components, such as an operating system that controls allocation and use of hardware resources.

As discussed herein, embodiments of the present invention include various steps or operations. A variety of these steps may be performed by hardware components or may be embodied in machine-executable instructions, which may be used to cause a general-purpose or special-purpose processor programmed with the instructions to perform the operations. Alternatively, the steps may be performed by a combination of hardware, software, and/or firmware. The term "module" refers to a self-contained functional component, which can include hardware, software, firmware or any combination thereof.

One of ordinary skill in the art will readily appreciate and understand, upon reading this description, that embodiments of an apparatus may include a computer/computing device operable to perform some (but not necessarily all) of the described process.

Embodiments of a computer-readable medium storing a program or data structure include a computer-readable medium storing a program that, when executed, can cause a processor to perform some (but not necessarily all) of the described process.

Where a process is described herein, those of ordinary skill in the art will appreciate that the process may operate without any user intervention. In another embodiment, the process includes some human intervention (e.g., a step is performed by or with the assistance of a human).

As used in this description, the term "portion" means some or all. So, for example, "A portion of X" may include some of "X" or all of "X". In the context of a conversation, the term "portion" means some or all of the conversation.

As used herein, including in the claims, the phrase "at least some" means "one or more," and includes the case of only one. Thus, e.g., the phrase "at least some ABCs" means "one or more ABCs", and includes the case of only one ABC.

As used herein, including in the claims, the phrase "based on" means "based in part on" or "based, at least in part, on," and is not exclusive. Thus, e.g., the phrase "based on factor X" means "based in part on factor X" or "based, at least in part, on factor X." Unless specifically stated by use of the word "only", the phrase "based on X" does not mean "based only on X."

As used herein, including in the claims, the phrase "using" means "using at least," and is not exclusive. Thus, e.g., the phrase "using X" means "using at least X." Unless specifically stated by use of the word "only", the phrase "using X" does not mean "using only X."

In general, as used herein, including in the claims, unless the word "only" is specifically used in a phrase, it should not be read into that phrase.

As used herein, including in the claims, the phrase "distinct" means "at least partially distinct." Unless specifically stated, distinct does not mean fully distinct. Thus, e.g., the phrase, "X is distinct from Y" means that "X is at least partially distinct from Y," and does not mean that "X is fully distinct from Y." Thus, as used herein, including in the claims, the phrase "X is distinct from Y" means that X differs from Y in at least some way.

As used herein, including in the claims, a list may include only one item, and, unless otherwise stated, a list of multiple items need not be ordered in any particular manner. A list may include duplicate items. For example, as used herein, the phrase "a list of XYZs" may include one or more "XYZs".

It should be appreciated that the words "first" and "second" in the description and claims are used to distinguish or identify, and not to show a serial or numerical limitation. Similarly, the use of letter or numerical labels (such as "(a)", "(b)", and the like) are used to help distinguish and/or identify, and not to show any serial or numerical limitation or ordering.

No ordering is implied by any of the labeled boxes in any of the flow diagrams unless specifically shown and stated. When disconnected boxes are shown in a diagram the activities associated with those boxes may be performed in any order, including fully or partially in parallel.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. A method comprising:
 (A) providing a gaming environment;
 (B) providing a first player character in the gaming environment;
 (C) providing access to a first user to control an action of the first player character within the gaming environment;
 (D) providing a first non-player character (NPC) and a corresponding first NPC engine in a standardized format in the gaming environment, wherein the first NPC engine controls an action of the first NPC;
 (E) receiving a second NPC and a corresponding second NPC engine in a non-standardized format from a first developer;
 (F) converting, by a computer system, the second NPC and the second NPC engine into the standardized format;
 (G) providing the standardized second NPC and the standardized second NPC engine in the gaming environment, wherein an action of the standardized second NPC is controlled by the standardized second NPC engine;
 (H) enabling the first user to indicate a first judgement, based at least in part on the action of the first player character, the action of the first NPC, and/or the action of the standardized second NPC, regarding whether the first NPC is under the control of the first NPC engine and/or whether the standardized second NPC is under the control of the standardized second NPC engine.

2. The method of claim 1 further comprising:
 (I) receiving the first judgement from the first user in (H); and
 (J) determining an accuracy of the first judgement.

3. The method of claim 2 further comprising:
 (K) in response to a determination in (J) that the first judgement is accurate, rewarding the first user;
 (L) in response to a determination in (J) that the first judgement is inaccurate, penalizing the first user.

4. The method of claim 3 wherein rewarding the first user in (K) includes providing the first user with a virtual prize, and/or penalizing the first user in (L) includes removing the first player character from the gaming environment.

5. The method of claim 1 wherein the action of the first player character includes a first comment directed to the first NPC, and the action of the first NPC includes a response to the first comment directed to the first player character.

6. The method of claim 1 wherein the action of the first player character includes a first comment directed to the standardized second NPC, and the action of the standardized second NPC includes a response to the first comment directed to the first player character.

7. The method of claim 1 further comprising:
 (I) providing a second player character in the gaming environment;
 (J) providing access to a second user to control an action of the second player character within the gaming environment.

8. The method of claim 7 further comprising:
 (K) enabling the second user to indicate a second judgement, based at least in part on the action of the second player character, the action of the first NPC, and/or the action of the standardized second NPC, regarding whether the first NPC is under the control of the first NPC engine and/or whether the standardized second NPC is under the control of the standardized second NPC engine.

9. The method of claim 8 further comprising:
(L) receiving the second judgement from the second user in (K); and
(M) determining an accuracy of the second judgement.

10. The method of claim 9 further comprising:
(N) in response to a determination in (M) that the second judgement is accurate, rewarding the second user;
(O) in response to a determination in (M) that the second judgement is inaccurate, penalizing the second user.

11. The method of claim 10 wherein rewarding the second user in (N) includes providing the second user with a virtual prize, and/or penalizing the second user in (O) includes removing the second player character from the gaming environment.

12. The method of claim 7 wherein the action of the second player character includes a first comment directed to the first NPC, and the action of the first NPC includes a response to the first comment directed to the second player character.

13. The method of claim 7 wherein the action of the second player character includes a first comment directed to the standardized second NPC, and the action of the standardized second NPC includes a response to the first comment directed to the second player character.

* * * * *